(12) United States Patent
Wang et al.

(10) Patent No.: US 8,000,094 B2
(45) Date of Patent: Aug. 16, 2011

(54) ROTATION MODULE AND ELECTRONIC DEVICE USING THE SAME

(75) Inventors: Jin-Xin Wang, Shenzhen (CN); Fan Zhou, Shenzhen (CN); Guo-Qi Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 126 days.

(21) Appl. No.: 12/486,078

(22) Filed: Jun. 17, 2009

(65) Prior Publication Data

US 2010/0097747 A1   Apr. 22, 2010

(30) Foreign Application Priority Data

Oct. 17, 2008  (CN) .......................... 2008 10 304980

(51) Int. Cl.
*G06F 1/16* (2006.01)

(52) U.S. Cl. ......... 361/679.26; 361/679.06; 361/679.21; 361/679.27; 248/125.7; 248/349.1; 248/917; 403/1; 403/2; 403/20; 312/223.1; 312/223.2

(58) Field of Classification Search ............. 361/679.07, 361/679.26
See application file for complete search history.

(56) References Cited

U.S. PATENT DOCUMENTS

| | | | | |
|---|---|---|---|---|
| 2,663,895 A * | 12/1953 | Petri | ................................ | 16/2.1 |
| 3,551,963 A * | 1/1971 | Mosher, Jr. et al. | ............ | 24/618 |
| 3,988,808 A * | 11/1976 | Poe et al. | ........................ | 24/326 |
| 5,016,849 A * | 5/1991 | Wu | .............................. | 248/176.3 |
| 5,127,137 A * | 7/1992 | Krauss | .......................... | 24/265 R |
| 5,507,460 A * | 4/1996 | Schneider | ................. | 248/225.21 |
| 5,548,478 A * | 8/1996 | Kumar et al. | ............ | 361/679.27 |
| 5,894,635 A * | 4/1999 | Lu | .................................... | 16/342 |
| 7,257,867 B2 * | 8/2007 | Mizukoshi et al. | ............. | 24/297 |
| 7,306,190 B2 * | 12/2007 | Tisol, Jr. | .................... | 248/206.5 |
| 7,515,405 B2 * | 4/2009 | Lev et al. | .................. | 361/679.55 |
| 7,800,893 B2 * | 9/2010 | Tracy et al. | ............. | 361/679.27 |
| 2004/0179330 A1 * | 9/2004 | Lee et al. | ...................... | 361/679 |
| 2005/0060843 A1 * | 3/2005 | Hung | .............................. | 16/367 |
| 2006/0081738 A1 * | 4/2006 | Huang et al. | ............... | 248/125.7 |
| 2006/0082518 A1 * | 4/2006 | Ram | .............................. | 345/1.1 |
| 2007/0215762 A1 * | 9/2007 | Lee et al. | .................. | 248/125.7 |
| 2008/0034551 A1 * | 2/2008 | Jeong | .............................. | 16/367 |
| 2008/0144266 A1 * | 6/2008 | Liu et al. | ...................... | 361/681 |
| 2009/0162164 A1 * | 6/2009 | Bohl | .............................. | 411/109 |
| 2009/0231791 A1 * | 9/2009 | Aoyama et al. | .......... | 361/679.07 |

FOREIGN PATENT DOCUMENTS

CN   101132425 A   2/2008

* cited by examiner

*Primary Examiner* — Jinhee Lee
*Assistant Examiner* — Anthony Q Edwards
(74) *Attorney, Agent, or Firm* — Clifford O. Chi

(57) ABSTRACT

A rotation module includes a base and a rotation member rotatably positioned on the base. The base includes a resisting surface and a connecting surface opposite to the resisting surface. A cylindrical protrusion is formed on the resisting surface. A locking portion is formed at an end of the cylindrical protrusion. The cylindrical protrusion defines an opening through the locking portion. The rotation member includes a bottom surface and a supporting surface opposite to the bottom surface. The rotation member defines a circular through hole. The locking portion is deformable due to the opening so that the cylindrical protrusion is able to pass through the circular through hole. The locking portion releases after the locking portion passes through the circular through hole and resists the rotation member to prevent the rotation member from detaching from the base.

11 Claims, 4 Drawing Sheets

ROTATION MODULE AND ELECTRONIC DEVICE USING THE SAME

BACKGROUND

1. Technical Field

The present disclosure relates to a rotation module and an electronic device using the same.

2. Description of the Related Art

A common electronic device includes a main body, a cover, and a rotation module connecting the cover to the main body. The rotation module includes a base and a rotating plate. The base has a pivotal shaft. A top end of the pivotal shaft forms a first tab and a second tab opposite to the first tab. The first tab is narrower than the second tab. The rotating plate defines a pivotal hole. A sidewall of the pivotal hole defines a first slot corresponding to the first tab and a second slot corresponding to the second tab.

During assembly of the electronic device, the first tab is aligned with the first slot and the second tab is aligned with the second slot. The pivotal shaft passes through the pivotal hole and rotates, thus the rotating plate is rotatably positioned on the base. The cover is attached to the rotating plate, and the base is fixed on the main body, with the cover rotatable relative to the main body.

However, the base can be easily detached from the rotating plate during use when the first tab is aligned with the first slot and the second tab is aligned with the second slot.

Therefore, a rotation module and an electronic device using the same that can overcome the described limitations are desirable.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
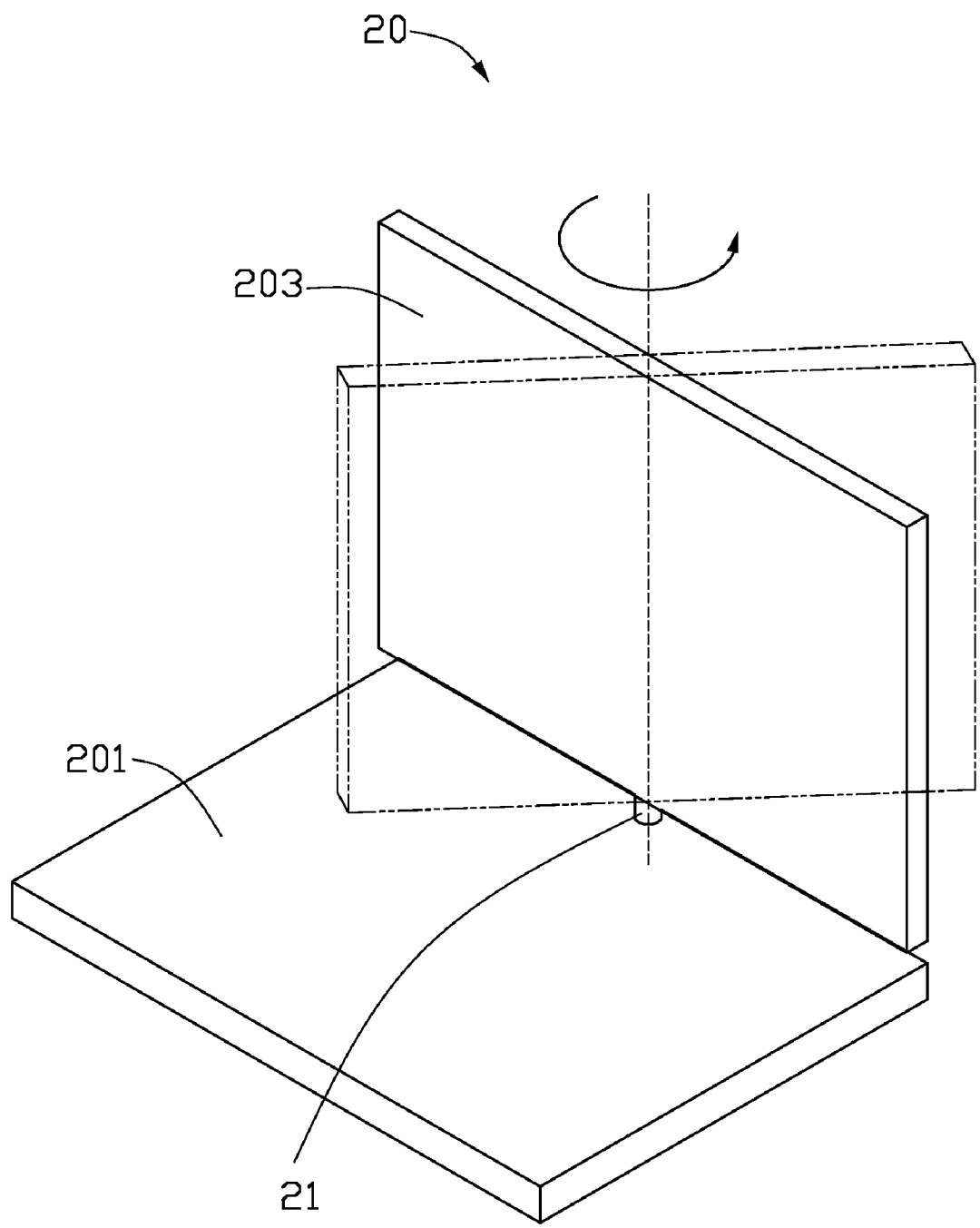
FIG. 1 is an isometric view of an embodiment of an electronic device, the electronic device including an embodiment of a rotation module.

Referring to FIG. 1, an embodiment of an electronic device 20 includes a main body 201, a cover 203, and an embodiment of a rotation module 21 connecting the main body 201 to the cover 203.

Figure 2:
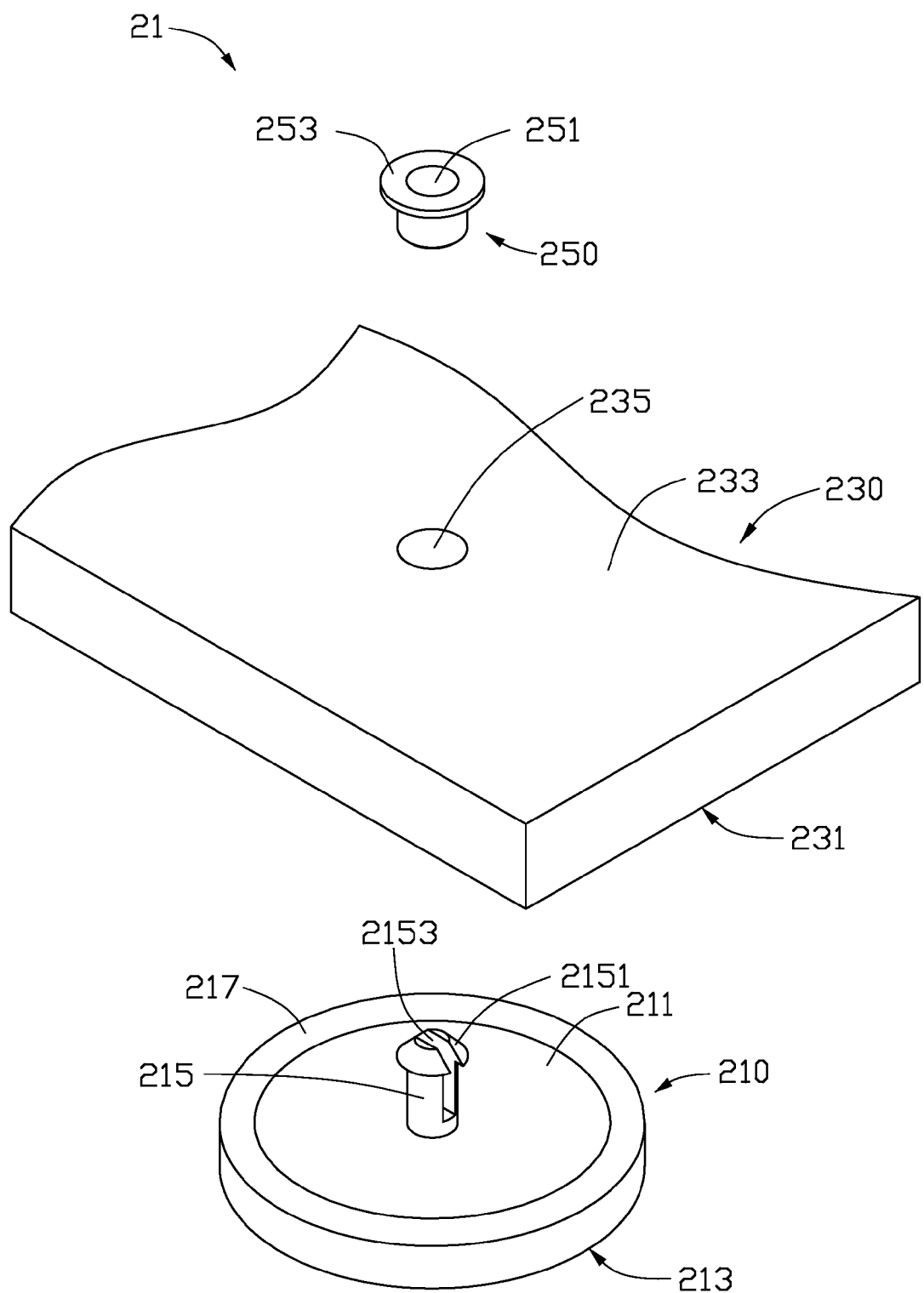
FIG. 2 is an exploded, isometric view of the rotation module for use with the electronic device, such as that of FIG. 1.

Referring to FIG. 2, the rotation module 21 includes a base 210, a rotation member 230 rotatably positioned on the base 210, and a protecting sleeve 250 to protect the base 210 and the rotation member 230.

The base 210 may be a substantially circular plate and includes a resisting surface 211 and a connecting surface 213 opposite to the resisting surface 211. A substantially cylindrical protrusion 215 and a substantially annular protrusion 217 surrounding the cylindrical protrusion 215 extend from the resisting surface 211. The cylindrical protrusion 215 may be in a central portion of the resisting surface 211, and the annular protrusion 217 may be on a periphery of the resisting surface 211. In addition, the cylindrical protrusion 215 extends farther than the annular protrusion 217.

A locking portion 2151 is formed at the end of the cylindrical protrusion 215. The locking portion 2151 may be conical or spherical shaped. In the illustrated embodiment, the locking portion 2151 is conical. In addition, the cylindrical protrusion 215 defines an opening 2153 through the locking portion 2151, allowing the cylindrical protrusion 215 to elastically deform.

The rotation member 230 includes a bottom surface 231 and a supporting surface 233 opposite to the bottom surface 231. The rotation member 230 defines a substantially circular through hole 235 communicating the bottom surface 231 with the supporting surface 233.

The protecting sleeve 250 defines a circular through hole 251 in a central portion thereof. In addition, an outer diameter of the protecting sleeve 250 is larger than an inner diameter of the circular through hole 235 of the rotation member 230 such that the protecting sleeve 250 can be fixed in the circular through hole 235 by interference fit. In addition, a flange 253 is formed at an end of the protecting sleeve 250 which resists the supporting surface 233 of the rotation member 230 after the protecting sleeve 250 is received in the circular through hole 235 of the rotation member 230, thus preventing the flange 253 from entering the circular through hole 235. The protecting sleeve 250 may be made of plastic. In the illustrated embodiment, the protecting sleeve 250 is made of nylon.

Figure 3:
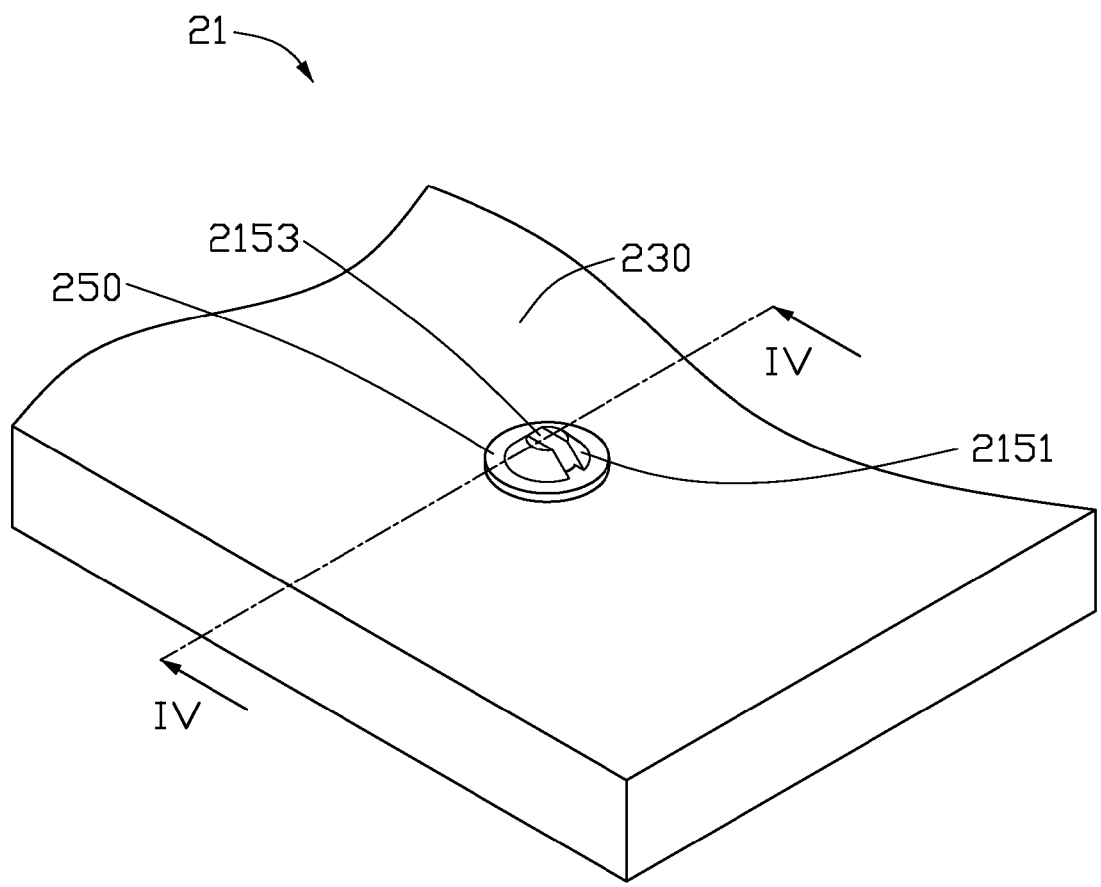
FIG. 3 is an isometric view of the rotation module of FIG. 2 after assembly.
Figure 4:
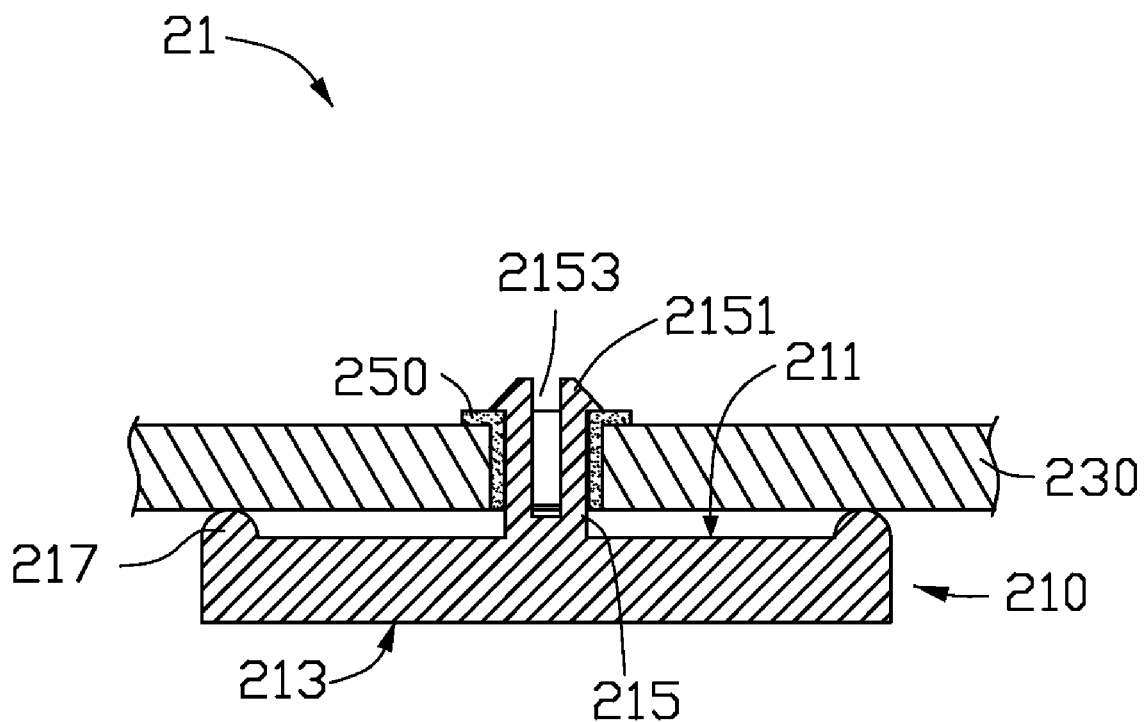
FIG. 4 is a cross-section taken along line IV-IV of FIG. 3.

Referring to FIGS. 3 and 4, to assemble the electronic device 20, the protecting sleeve 250 is positioned in the circular through hole 235 of the rotation member 230 with the flange 253 resisting the supporting surface 233 of the rotation member 230. The base 210 is pressed towards the rotation member 230 from the bottom surface 231 with the locking portion 2151 of the cylindrical protrusion 215 inserted into the circular through hole 251 of the protecting sleeve 250. The locking portion 2152 deforms towards each other due to the opening 2153 until the locking portion 2151 can slide along an inner sidewall of the circular through hole 251. Once the locking portion 2151 elastically returns to its original shape once it exits the circular through hole 251 and resists the periphery of the flange 253 of the protecting sleeve 250, thus prevents the rotation member 230 from detaching from the base 210.

After the rotation module 21 is assembled, the connecting surface 213 of the base 210 is fixed to the main body 201, and the supporting surface 233 of the rotation member 230 is fixed to the cover 203, thus yielding the electronic device 20 as shown in FIG. 1. The rotation member 230 is rotatable relative to the base 210 so that the cover 203 is able to rotate relative to the main body 201.

It should be pointed out that since the locking portion 2151 easily passes through the circular through hole 251 of the protecting sleeve 250 because the locking portion 2151 deforms due to the opening 2153, assembly is simplified. Furthermore, when the locking portion 2151 slides along the inner sidewall of the circular through hole 251 of the circular through hole 251, the contact surface area between the conical protrusion and the inner sidewall of the circular through hole 251 is relatively small, minimizing frictional force between the cylindrical protrusion 215 and the protecting sleeve 250, simplifying assembly of electronic device 20. In addition, the locking portion 2151 releases and resists the flange 253 of the protecting sleeve 250 after the locking portion 2151 passes through the circular through hole 251, thus preventing the rotation member 230 from detaching from the base 210, enhancing mechanical reliability.

Furthermore, a friction force generated between the base 210 and the rotation member 230 maintains the rotation member 230 in a desired position relative to the base 210, because the annular protrusion 217 of the base 210 resists the bottom surface 231 of the rotation member 230.

A frictional force between the cylindrical protrusion 215 and the protecting sleeve 250 may be decreased because the protecting sleeve 250 is made of nylon and the inner sidewall of the protecting sleeve 250 is smooth. Therefore, abrasion between the cylindrical protrusion 215 and the protecting sleeve 250 is decreased. In addition, the locking portion 2151 is easily received in the circular through hole 251 of the protecting sleeve 250 because the locking portion 2151 is conical.

Since the friction coefficient between the protecting sleeve 250 and the cylindrical protrusion 215 is relatively small, abrasion of the protecting sleeve 250 or the cylindrical protrusion 215 is decreased, increasing the functional life of the rotation module 21. However, it can be understood that the protecting sleeve 250 may be omitted in consideration of cost.

Finally, while various embodiments have been described and illustrated, the embodiments are not to be construed as being limited thereto. Various modifications can be made to the embodiments by those skilled in the art without departing from the true spirit and scope of the embodiments as defined by the appended claims.

What is claimed is:

1. A rotation module comprising:
a base comprising a resisting surface, a connecting surface opposite to the resisting surface, and a cylindrical protrusion extending from the resisting surface, wherein a locking portion is formed at an end of the cylindrical protrusion, and the cylindrical protrusion defines an opening through the locking portion; and
a rotation member comprising a bottom surface and a supporting surface opposite to the bottom surface, the rotation member defining a substantially circular through hole communicating the bottom surface with the supporting surface;
wherein the cylindrical protrusion is received in the circular through hole so that the rotation member is rotatable relative to the base; the locking portion being deformable due to the opening, such that the cylindrical protrusion is able to pass through the circular through hole, after which the locking portion releases and resists the rotation member to prevent the rotation member from detaching from the base;
wherein the rotation module further comprises a protecting sleeve positioned in the circular through hole of the rotation member; a flange is formed at an end of the protecting sleeve, the flange resists the supporting surface of the rotation member, and the locking portion resists the flange; and wherein the resisting surface forms an annular protrusion; the cylindrical protrusion is taller than the annular protrusion; the annular protrusion resists the bottom surface of the rotation member to provide complete circular rotation of the rotation member.

2. The rotation module of claim 1, wherein the protecting sleeve is tightly received in the circular through hole of the rotation member.

3. The rotation module of claim 1, wherein the protecting sleeve is made of plastic.

4. The rotation module of claim 3, wherein the protecting sleeve is made of nylon.

5. The rotation module of claim 1, wherein the cylindrical protrusion extends from a central portion of the resisting surface, and the annular protrusion surrounds the cylindrical protrusion and extends from a periphery of the resisting surface.

6. The rotation module of claim 1, wherein the locking portion is substantially conical.

7. An electronic device comprising:
a main body;
a cover; and
a rotation module rotatably connecting the main body to the cover, the rotation module comprising:
a base comprising a resisting surface, a connecting surface opposite to the resisting surface, and a cylindrical protrusion extending from the resisting surface, wherein the connecting surface is fixed to the main body, a locking portion is formed at an end of the cylindrical protrusion, and the cylindrical protrusion defines an opening through the locking portion; and
a rotation member comprising a bottom surface and a supporting surface opposite to the bottom surface, wherein the rotation member defines a circular through hole communicating the bottom surface with the supporting surface; the cover is fixed to the supporting surface; the cylindrical protrusion is received in the circular through hole such that the rotation member is rotatable relative to the base; the locking portion is deformable due to the opening such that the cylindrical protrusion is able to pass through the circular through hole, and the locking portion returns to its original state after the locking portion passes through the circular through hole and resists the rotation member to prevent the rotation member from detaching from the base.
wherein the rotation module further comprises a protecting sleeve positioned in the circular through hole of the rotation member; a flange is formed at an end of the protecting sleeve, the flange resists the supporting surface of the rotation member, and the locking portion resists the flange; and wherein the resisting surface forms an annular protrusion; the cylindrical protrusion is taller than the annular protrusion; the annular protrusion resists the bottom surface of the rotation member to provide complete circular rotation of the rotation member.

8. The electronic device of claim 7, wherein the protecting sleeve is received in the circular through hole of the rotation member by interference fit.

9. The electronic device of claim 7, wherein the protecting sleeve is made of plastic.

10. The electronic device of claim 9, wherein the protecting sleeve is made of nylon.

11. The electronic device of claim 7, wherein the cylindrical protrusion extends from a central portion of the resisting surface, and the annular protrusion surrounds the cylindrical protrusion and extends from a periphery of the resisting surface.

* * * * *